(12) United States Patent
Kittler et al.

(10) Patent No.: US 7,519,828 B2
(45) Date of Patent: Apr. 14, 2009

(54) PERSONAL IDENTITY VERIFICATION PROCESS AND SYSTEM

(75) Inventors: Josef Kittler, Guildford (GB); Terry Windeatt, Farnham (GB)

(73) Assignee: Omniperception Limited, Guildford, Surrey (GB)

( * ) Notice: Subject to any disclaimer, the term of this patent is extended or adjusted under 35 U.S.C. 154(b) by 651 days.

(21) Appl. No.: 10/479,171

(22) PCT Filed: May 30, 2002

(86) PCT No.: PCT/GB02/02524

§ 371 (c)(1),
(2), (4) Date: May 3, 2004

(87) PCT Pub. No.: WO02/097719

PCT Pub. Date: Dec. 5, 2002

(65) Prior Publication Data

US 2004/0199776 A1    Oct. 7, 2004

(30) Foreign Application Priority Data

May 31, 2001   (GB) ................................. 0113263.8

(51) Int. Cl.
*G06F 21/00* (2006.01)
(52) U.S. Cl. .................................................... 713/186
(58) Field of Classification Search .................. 713/186
See application file for complete search history.

(56) References Cited

U.S. PATENT DOCUMENTS 5,245,329 A * 9/1993 Gokcebay .................. 340/5.33
5,809,490 A * 9/1998 Guiver et al. .................. 706/16
5,943,434 A * 8/1999 Schwarz ..................... 382/131
6,038,315 A * 3/2000 Strait et al. ................. 713/183
6,826,300 B2 * 11/2004 Liu et al. .................... 382/159

OTHER PUBLICATIONS

J. Matas, et al.; "Fast Face Locallisation and Verification"; Centre for Vision, Speech and Signal Processing University of Surrey, pp. 1-13, Apr. 1999.
L. Sirovich et al.; "Low-dimensional procedure for the characterization of human faces"; Optical Society of Amemica A, vol. 4, p. 519-524, Mar. 1997.
Thomas G. Dietterich et al.; "Error-Correcting Output Codes: A General Method for Improving Multiclass Inductive Learning Programs"; Dept. of Computer Science; Oregon State University, pp. 1-6.

(Continued)

*Primary Examiner*—Gilberto Barron, Jr.
*Assistant Examiner*—Devin Almeida
(74) *Attorney, Agent, or Firm*—Leydig, Voit & Mayer, Ltd.

(57) ABSTRACT

A personal identity verification process and system adopts an error correcting output code (ECOC) classifier approach. Image data representing an input facial images is processed to generate a first (ECOC) classifier output vector and image data representing a class of different training images of the face of an individual are processed to generate a set of second ECOC classifier output vectors. Authenticity of the input facial image against the class of training images is evaluated by measuring distance between the first ECOC classifier output vector and the set of second ECOC classifier output vectors using a first order Minkowski metric.

8 Claims, 2 Drawing Sheets

OTHER PUBLICATIONS

Thomas G. Dietterich et al.; "Solving Multiclass Learning Problems via Error-Correcting Output Codes"; Journal of Artificial Intelligence Research 2 (1995) pp. 263-286.

Terrence J. Sejnowski et al.; "Parallel Networks that Learn to Pronounce English Text"; Complex Systems 1 (1987), pp. 145-168.

Reza Ghaderi, et al.; "Circular ECOC, A theoretical and experimental analysis"; Proceedings of the International Conference on Pattern Recognition, pp.

Terry Windeatt et al. "Binary codes for multi-class decision combining"; In Sensor Fusion: Architectures, Algorithms, and Applications IV, Proceedings of SPIE, vol. 4051 (2000), pp. 23-34.

Eun Bae Kong et al.; "Probability Estimation via Error-Correcting Output Coding"; IASTED International Conference: Artificial Intelligence and Soft Computing, pp. 1-6.

K. Messer, et al. "M2VTSDB: The Extended M2VTS Database"; Second International Conference of Audio and Video-based Biometric Person Authentication (AVBPA 1999), pp. 1-6.

Souheil Ben-Yacoub et al.; "Audio-Visual Person Verification"; IDIAP, Nov. 1998, pp. 1-9.

Juergen Luettin et al.; "Evaluation Protocol For The XM2FDB Database (Lausanne Protocol)"; IDIAP, Oct. 1998, pp. 1-12.

F. S. Samaria et al.; "Parameterisation of a Stochastic Model for Human Face Identification"; Engineering Dept. University of Cambridge; pp. 138-142.

Reza Ghaderi et al.; "Circular ECOC: A theoretical experimental analysis"; Proceedings of the International Conference on Pattern Recognition, 2000; pp. 1-4.

J. Matas et al.; "Comparison of face verification results on the XM2VTS database"; pp. 1-6.

J. Kittler; "Face Authentication Using Client Specific Fisherfaces"; Center for Vision Speech and Signal Processing; University of Surrey, Nov. 1999; pp. 1-24.

J. Kittler, et al.; "On Matching scores for LDA-based face verification"; Centre for Vision, Speech and Signal Processing; University of Surrey; pp. 1-10.

Youngpil Lee; "Linear Discriminant Analysis and its application to Face Identification"; Center for Vision, Speech and Signal Processing; School of Electronic Engineering, Information technology and Mathematics, University of Surrey; Sep. 2000, pp. 1-155.

J. Kittler et al. "Multiple Classifier Systems", Springer-Verlag, Berlin, Germany 2000.

P.N. Belhummer et al. "Eigenfaces vs. Fisherfaces: Recognition Using Class Specific Linear Projection", Proc. Of ECCV '96, pp. 45-58, Cambridge, United Kingdom, 1996.

W.W. Peterson et al. "Error-Correcting Codes", MIT press, pp. 162-182, Cambridge, MA, 1972.

Gareth James, "Majority Vote Classifiers", PhD Thesis, Dept. of Statistics, Stanford University, May 1998.

* cited by examiner

PERSONAL IDENTITY VERIFICATION PROCESS AND SYSTEM

FIELD OF THE INVENTION

This invention relates to a personal identity verification process and system.

BACKGROUND

Automatic verification and authentication of personal identity based on biometric measurements has become popular in security applications. Existing commercial systems exploit a myriad of biometric modalities including voice characteristics, iris scan and finger print. However, as a source of biometric information, the human face plays a particularly important role because facial images (e.g. photographs) can easily be acquired and also they convey discriminatory features which are routinely used for recognition by humans without the need for specialist training. This opens the possibility for a close human-machine interaction and cooperation.

Unfortunately, hitherto, the performance of automatic systems for face verification has often been poor. Although considerable progress has been made over recent years, face verification is still a challenging task. For this reason one of the recent paradigms has been to use multiple modalities to achieve robustness and improved performance. Typically, voice and face data has been combined, as described by S. Ben-Yacoub et al in "Audio-visual person verification", Computer Vision and Pattern Recognition, pp 580-585, June 1999, IEEE Computer Society to achieve better verification rates (i.e. lower false rejection and false acceptance rates). However, the merits of the combination of other modalities including face profile, lip dynamics and 3D face information to name but a few have also been investigated. Although the multimodal approach has been demonstrated to achieve significant improvements, there is still the need to improve the performance of the constituent biometric subsystems to drive the error rates even lower. Some advances recently reported in this context include those described in "On matching scores for LDA-based face verification" by J. Kittler et al, British Machine Vision Conference 2000, ed M. Mirmehdi and B. Thomas.

As another direction to gain performance improvements, attempts have been made to combine the outputs of several decision making systems. This approach draws on the results obtained from multiple classifier fusion described in "Multiple Classifier Systems" edited by J. Kittler et al, Springer-Verlag, Berlin 2000. By combining several opinions as to authenticity it is possible to reduce the error variance of the outputs of the individual experts and achieve better error rates. In "Face verification using client-specific fisher faces" by J. Kittler et al, The Statistics of Directions, Shapes and Images pages 63-66, 2000, ed. J. T. Kent and R. G. Aykroyd, it was shown that by combining the scores of several diverse face verification systems the error rate of the best expert could be reduced by more than 42%. However, such ad hoc designs of multiple expert systems may not necessarily produce the best solutions.

With a view to at least alleviating the afore-mentioned problems the present invention provides a personal identity verification process and system employing an error correcting output coding (ECOC) approach. ECOC was developed for channel coding. The basic idea of ECOC is to allocate additional bits over and above the number of bits required to code a source message in order to provide error correcting capability. In the context of pattern classification the idea implies that each class of pattern is represented by a more complex code than the conventional code, $Z_{ij}=0 \ \forall_i \neq j$ and $Z_{ij}=1 \ i=j$. The implementation of such error resilient code requires more than the usual number of classifiers.

The main difficulty in applying the ECOC classification method to the problem of face verification is that face verification is a two class problem (i.e. involving a client class and an imposter class), whereas ECOC is suited exclusively to multiclass problems. This difficulty can be overcome by adopting a two stage solution to the verification problem. In the first stage, the verification task can be viewed as a recognition problem and an ECOC design can be developed to generate class specific discriminants. In fact, only the discriminant for the class of the claimed identity is needed. In the second stage, the hypothesis that the generated discriminant is consistent with the distributions of responses for the particular client.

SUMMARY OF THE INVENTION

According to the invention there is provided a personal identity verification process for evaluating authenticity of an input facial image against a class of different training images representing the face of an individual, the process including processing image data representing the input facial image to generate a first error correcting output code (ECOC) classifier output vector, processing image data representing the different training images of said class to generate a set of second ECOC classifier output vectors, comparing said first ECOC classifier output vector with said set of second ECOC classifier output vectors, and evaluating authenticity of said input facial image with respect to said class of training images in dependence on the comparison.

The invention provides an effective design which exploits the attractive properties of ECOC classifiers but at the same time it is applicable to the two class personal identity verification problem. This design approach has been tested on the XM2VTS face database using the Lausanne protocol. The false rejection and false acceptance rates achieved are found to be superior to the best reported results on this database to date as reported by J. Matas et al in "Comparison of face verification results on the XM2VTS database" Proceedings of the 15th ICPR, vol 4, pages 858-863, Los Alamitos USA, September 2000, IEEE Computer Soc Press.

Embodiments of the invention, and test results obtained using these embodiments are now described, by way of example only.

BRIEF DESCRIPTION OF DRAWING FIGURES

DETAILED DESCRIPTION

Face Image Representation

Figure 1:
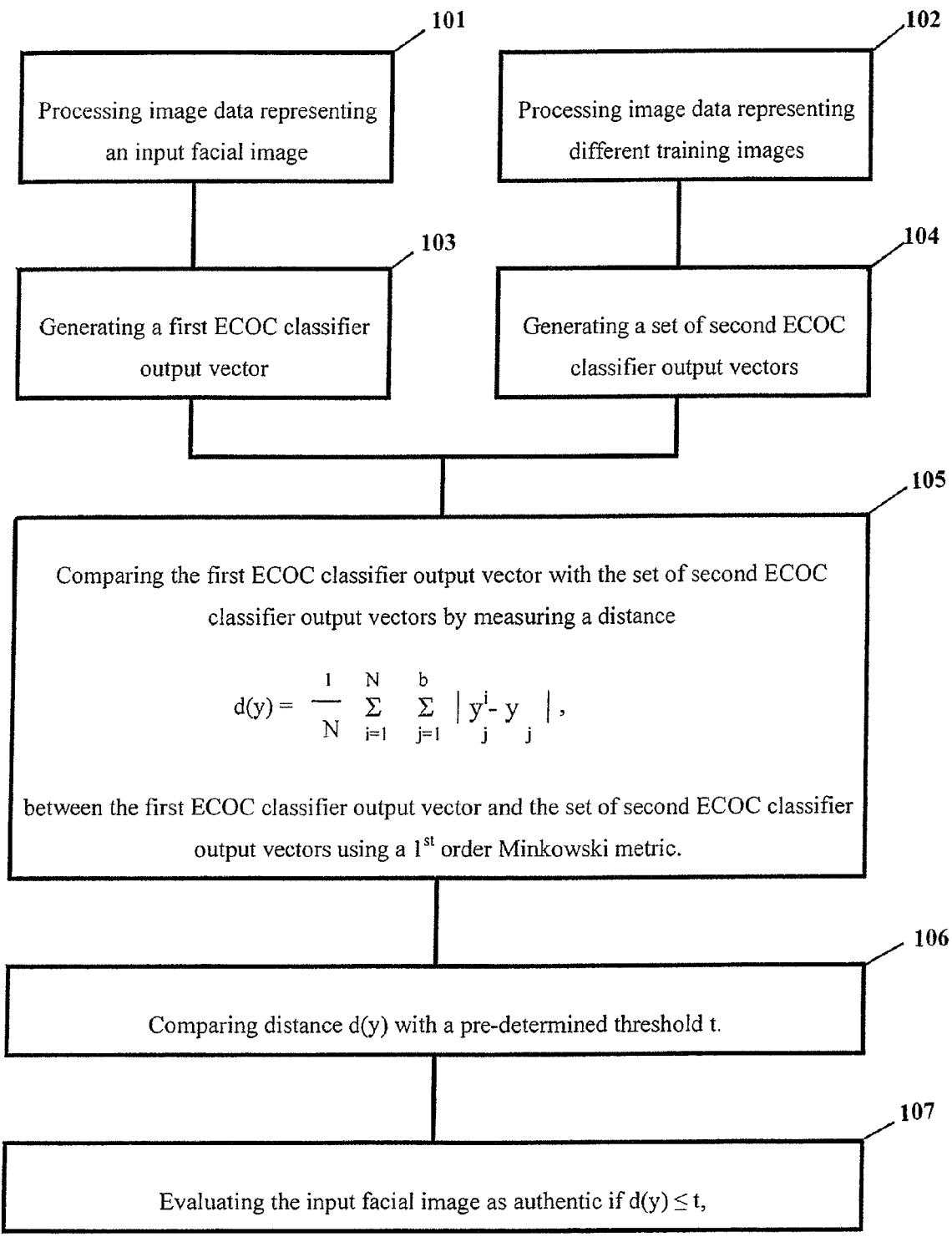
FIG. 1 is a block diagram showing the steps involved in authenticating a facial image according to one embodiment of the invention.

Normalisation or standardisation of facial images is an important stage in face recognition or verification. Facial images differ in both shape and intensity, so shape alignment (geometric normalisation) and intensity correction (photometric normalization) can improve performance of the designed system. In this embodiment, the approach to geometric normalisation is based on eye position. Four parameters are computed from the eye coordinates (i.e. rotation, scaling and translation in horizontal and vertical directions) to crop the face part from the original image and scale it to any desired resolution. "Manually localised" eye co-ordinates are used to eliminate the dependency of the experiments on processes which may lack robustness. In this way, it is possible to focus the investigation on how the performance is affected by the methodology of verification, and in particular by the ECOC technique. For photometric normalisation, histogram equalisation has been used as this has been shown to exhibit better performance in comparison with other existing methods (e.g. the method described in "Linear Discriminant Analysis and its application to face identification" by Y. P. Li, Ph.D Thesis, University of Surrey, September 2000).

Although it is possible to use gray levels directly, as demonstrated in earlier experiments (see, for example, "Parameterisation of a stochastic model for human face identification" by F. S. Samaria et al, Proceedings of the 2nd IEEE Workshop on application of computer vision, Sarasota, Fla., 1994. http://mambo.ucsc.edu/psl/olivetti.html., and "Fast face localisation and verification" by J. Matas et al IVC, 17(8) pages 578-581, June 1999) normally features are first extracted. There are many techniques described in the pattern recognition literature for extracting and selecting effective features that provide maximal class separation in the feature space as described in "Pattern Recognition: A Statistical Approach" by P. A. Devijver et al, Prentice Hall, 1982. One popular approach is Linear Discriminant Analysis (LDA), and this is the approach used in this described embodiment. A brief review of the theory of LDA, and how it is applied to face recognition or verification follows. Further details may be found in the afore-mentioned "Pattern Recognition: A Statistical Approach" by P. A. Devijver et al and in "Eigenfaces vs. fisherfaces: Recognition using class specific linear projection" by P. N. Belhumeur et al Proc. of ECCV'96, pages 45-58, Cambridge, United Kingdom, 1996.

Given a set of vectors $x_i$, i=1,...,M, $x_i \in R^D$, each belonging to one of c classes $\{C_1, C_2, \ldots C_c\}$, the between-class scatter matrix, $S_B$, is computed as:

$$S_B = \sum_{i=1}^{c} (\mu_i - \mu)(\mu_i - \mu)^T \quad (1)$$

and the within-class scatter matrix, $S_w$ is computed as:

$$S_w = \sum_{i=1}^{c} \sum_{x_k \in C_i} (x_k - \mu_i)(x_k - \mu_i)^T \quad (2)$$

where $\mu$ is the grand mean and $\mu_i$ s the mean of class $C_i$.

The objective of LDA is to find the transformation matrix, $W_{opt}$, that maximises the ratio of determinants $$\frac{|W^T S_B W|}{|W^T S_w W|}.$$

$W_{opt}$ is known to be the solution of the following eigenvalue problem:

$$S_B W - S_W W \Lambda = 0 \quad (3)$$

where $\Lambda$ is a diagonal matrix whose elements are the eigenvalues of matrix $S_W^{-1} S_B$. (See the afore-mentioned "Pattern Recognition: A Statistical Approach" by P. A. Devijver et al). The column vectors $\bar{w}_i$ (i=1,...,c-1) of matrix W are referred to as fisherfaces as described in the afore-mentioned "Eigenfaces vs. fisherfaces: Recognition using class specific linear projection" by P. N. Belhumeur et al.

In high dimensional problems (e.g. in the case where $x_i$ are images and D is ≈$10^5$). $S_W$ is almost always singular, since the number of training samples M is much smaller than D. Therefore, an initial dimensionality reduction must be applied before solving the eigenvalue problem defined by equation (3) above. Commonly, dimensionality reduction is achieved by Principal Component Analysis (see, for example, "Low-dimensional procedure for the characterization on human face" by L. Sirovich et al Journal. Opt. Soc. Am, A, 3(4) pages 519-524,1987 and the afore-mentioned "Eigenfaces vs. fisherfaces: Recognition using class specific linear projection" by P. N. Belhumeur et al); the first (M-c) eigenprojections are used to represent vectors $x_i$. The dimensionality reduction also allows $S_W$ and $S_B$ to be efficiently calculated. The optimal linear feature extractor $W_{opt}$ is then defined as:

$$W_{opt} = W_{lda} * W_{pca} \quad (4)$$

where $W_{pca}$ is the PCA projection matrix and $W_{lda}$ is the optimal projection obtained by maximising $$W_{lda} = \underset{W}{\operatorname{argmax}} \frac{|W^T W_{pca}^T S_W W_{pca} W|}{|W^T W_{pca}^T S_B W_{pca} W|} \quad (5)$$

ECOC Verification Method

Error Correcting Output Coding (ECOC) is an information theoretic concept which suggests that there may be advantages in employing ECOC codes to represent different signals which should be distinguished from each other after being corrupted while passing through a transmission channel. A paper entitled "Error correcting output codes: A general method for improving multiclass inductive learning programs" by T. G. Diettentch et al, pages 572-577, Proceedings of the Ninth National Conference on Artificial Intelligence (AAAI-91), AAAI Pres, 1991 suggests that classification can be modelled as a transmission channel consisting of "input features", "training samples", and "learning paradigm". Classes are represented by code words with a large Hamming distance between any pair. ECOC is believed to improve performance both by decomposing the multi-class problem as well as by correcting errors in the decision-making stage (see "Solving multi-class learning problems via error-correcting output codes" by T. G. Dietterich et al Journal of Artificial Intelligence Research, 2 pages 263-286, 1995). The binary values in the code word matrix are determined by the code generation procedure; it is possible to choose values that provide a meaningful decomposition (see, for example, "Parallel networks that learn to pronounce english text" by T. J. Senjnowski et al Complex systems, 1(1) pages 145-168, 1987) but usually there is no meaning attached (see the aforementioned "Solving multi-class learning problems via error-correcting output codes" by T. G. Dietterich et al; "Circular ecoc, a theoretical and experimental analysis" by R. Ghaderi et al pages 203-206, Barcelona, Spain, September 2000. International Conference of Pattern Recognition (ICPR2000); "Binary codes for multi-class decision combining" by T. Windeatt et al, volume 4051, pages 23-24, Florida, USA, April 2000. 14th Annual International Conference of Society of Photo-Optical Instrumentation Engineers (SPIE) and "Probability estimation via error-correcting output coding" by E. B. Kong et al, Banff, Canada, 1997. Int. Conf. of Artificial Intelligence and soft computing, http://wwww/cs/orst.edu/tgd/cv/pubs.html). There are a few methods to find a set of code words with a guaranteed minimum distance between any pair, the most popular being the BCH codes described in the afore-mentioned "Solving multi-class learning problems via error-correcting output codes" by T. G. Dietterich et al and in "Error-Correcting Codes" by W. W. Peterson et al, MIT press, Cambridge, Mass., 1972, which are adopted in the described embodiment of the invention.

To understand the ECOC algorithm, consider a k×b code word matrix Z (k is the number of classes) in which the k rows represent code words (labels), one for each class. In the training phase, for each column, the patterns are re-labelled according to the binary values ("1s" and "0s"), thereby defining two super classes. A binary classifier is trained b times, once for each column. Each pattern can now be transformed into ECOC feature space by the b classifiers, giving a vector $$\underline{y} = [y_1 y_2, \ldots y_b]^T \qquad (6)$$

in which $y_j$ is the real-valued output of the jth classifier. In the test phase, the distance $L_i$ between the output vector and the label for each class is determined by:

$$L_i = \sum_{j=1}^{b} |Z_{ij} - y_j| \qquad (7)$$

and an input pattern is assigned to the class corresponding to the code word having the minimum distance to $\underline{y}$.

In the case of verification, with which the present invention is concerned, the task is somewhat different. Here it is desired to ascertain the classifier outputs are jointly consistent with the claimed identity. This could be accomplished by setting a threshold on the distance of the outputs from the client code. However, the compound code represents an idealised target, rather than the real distribution of these outputs. Thus, measuring the distance from the client code could be misleading, especially in spaces of high dimensionality.

An alternative approach would be to adopt the centroid of the joint classifier outputs to characterise each client and to measure the consistency of a new client claim from this representation. Use of the centroid in the context of ECOC classifiers is advocated in "Majority Vote Classifiers: Theory and Applications" by G. James, PhD thesis, Dept. of Statistics, Univ. of Stanford, May 1998. http://wwww/stat/stanford.edu./gareth/. However, in the present case, because there is only a very small number of training images, the estimated centroid would be very unreliable. In accordance with the present invention, each client i is represented by a respective set $Y_i$ of N ECOC classifier output vectors derived from the training images of the ith client i.e.

$$Y_i = \{\underline{y}_i^l | l = 1, 2, \ldots N\} \qquad (8)$$

where N is the number of available training images for the ith client. In order to test the hypothesis that the client claim is authentic the average distance between vector $\underline{y}$ (derived from the input facial image) and the elements of set $Y_i$ (derived from the training images of the ith client class) is adopted as a test statistic. In this embodiment, the distance is measured using first order Minkowski metric rather than Euclidean metric of equation (3) above in order to achieve better robustness to outliers. The distance $d_i(\underline{y})$ evaluated in this way is given by the expression:

$$d_i(\underline{y}) = \frac{1}{N} \sum_{l=1}^{N} \sum_{j=1}^{b} |y_j^l - y_j| \qquad (9)$$

where $y_j$ is the jth element of the ECOC classifier output vector dervied from the input facial image and $y_j^l$ is the jth element of the lth member of the set $Y_i$ of ECOC classifier output vectors derived from the training images of the ith client class. The distance is checked against a decision threshold, t. If the distance is below the threshold, the client's claim is accepted, i.e. authenticity of the input facial image with respect to the ith class of training images is confirmed; otherwise it is rejected, i.e.

$$d_i(\underline{y}) \begin{cases} \leq t & \text{accept claim} \\ > t & \text{reject claim} \end{cases} \qquad (10)$$

Instead of measuring the distance between points, alternatively, it is possible to measure between-point similarity which can be expressed by a kernel function that assumes a maximum when the distance is zero and monotonically decreases as the distance increases. The design of the decision function cannot involve any training as the number of points available is extremely small. We simply use exponential kernels with fixed width σ. The centres do not need to be explicitly determined because the distance $d_i(\underline{y})$ is used in the exponent of the kernel to measure similarity of $\underline{y}$ to the respective class i. One kernel is allocated to the client class and to each of a number of impostor classes. The relative similarities of a test vector $\underline{y}$ (derived from the input facial image) to the claimed client class and to the impostor classes are measured as:

$$k_i(\underline{y}) = \sum_{\alpha} w_{\alpha} \exp\left\{-\frac{d_{\alpha}(\underline{y})}{\sigma^2}\right\} \qquad (11)$$

where index α runs over the ith class and all impostor classes and the respective weights $w_\alpha$ are estimated. The client claim test is carried out as follows:

$$k_i(\underline{y}) \begin{cases} \geq 0.5 & \text{accept claim} \\ < 0.5 & \text{reject claim} \end{cases} \quad (12)$$

FIG. 1 is a block diagram showing steps involved in authenticating a facial image according to one embodiment of the invention.

In step 101, image data representing a input facial image is processed. In step 102, image data representing different training images is processed. In step 103, a first ECOC classifier output vector is generated from the output of step 101. In step 104, a set of second ECOC classifier output vectors is generated from the output of step 102. In step 105, the vectors generated in steps 103 and 104 are compared by measuring a distance d(y) between the vectors using a first order Minkowski metric. In step 106, the measured distance d(y) is compared to a pre-determined threshold t. In step 107, the input facial image is determined to be authentic if d(y)≦t.

Figure 2:
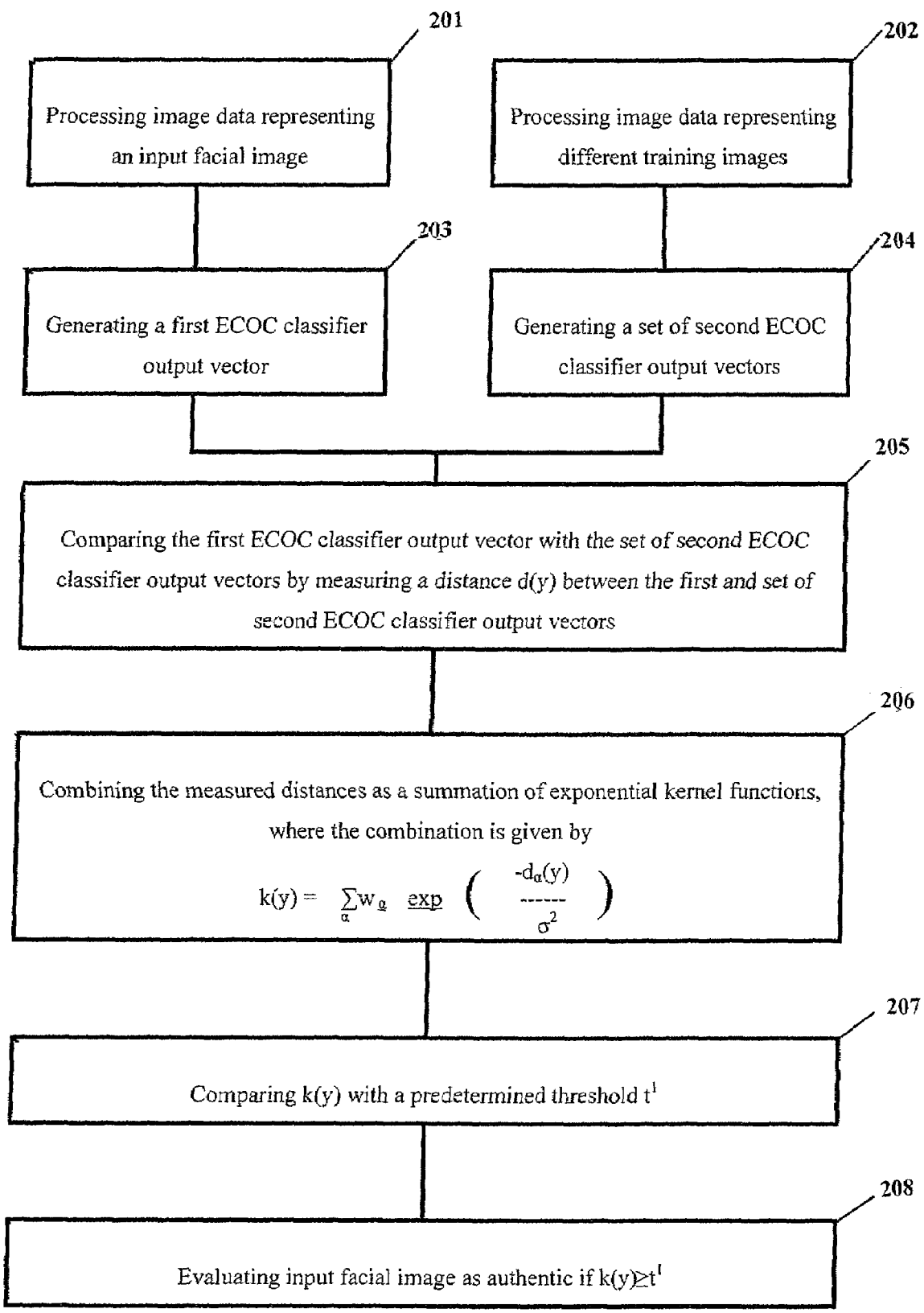
FIG. 2 is a block diagram showing the steps involved in authenticating a facial image according to another embodiment of the invention.

FIG. 2 is block diagram showing the steps involved in authenticating a facial image according to a second embodiment of the invention.

Steps 201-204 correspond to steps 101-104 of FIG. 1. In step 205, the vectors generated in steps 203 and 204 are compared by measuring a distance d(y) between the vectors. In step 206, the measured distances are combined as a summation of expositional kernel functions to produce combination k(y). In step 207, the combination k(y) is compared with a pre-determined threshold $t^l$. In step 208, the input facial image is determined to be authentic if k(y)≦$t^l$.

Experiments on XM2VTS Data Base

The above described approach to personal identity verification has been tested by the inventors using the XM2VTS face database because it is known to be challenging and because several results of experiments, carried out according to an internationally agreed protocol using other verification methods, are readily available in the literature for comparison.

Database and Experimental Protocol

The extended M2VTS (XM2VTS) database contains 295 subjects. The subjects were recorded in four separate sessions uniformly distributed over a period of 5 months, and within each session a number of shots were taken including both frontal-view and rotation sequences. In the frontal-view sequences the subjects read a specific text (providing synchronised image and speech data), and in the rotation sequences the head was moved vertically and horizontally (providing information useful for 3D surface modelling of the head). Further details of this database can be found in "XM2VTSDB: The extended M2VTS database" by K. Messer et al Proc. of AVBPA '99, pages 72-77, 1999.

The experimental protocol (known as Lausanne evaluation protocol) provides a framework within which the performance of vision-based (and speech-based) person authentication systems running on the extended M2VTS database can be measured. The protocol assigns 200 clients and 95 imposters. Two shots of each session for each subject's frontal or near frontal images are selected to compose two configurations. In this evaluation the first configuration was used. This is more difficult as the reported results in the afore-mentioned "Comparison of face verification results on the xm2vts database" by J. Matas et al show. In this configuration, for each client there are 3 training, 3 evaluation and 2 test images. The imposter set is partitioned into 25 evaluation and 70 test imposters. Within the protocol, the verification performance is measured using both the false acceptance and the false rejection rates. The operating point where these two error rates equal each other is typically referred to as the equal error rate point. Details of this protocol can be found in "Evaluation Protocol For The Extended M2VTS Database (XM2VTS)" by J. Luettin et al Dalle Molle Institute for Perceptual Artificial Intelligence, P.O. Box 592 Martigny, Valais, Switzerland, July 1998. IDIAP-Com 98-05.

System Description

In this embodiment of the invention, all images are projected into a lower dimensional feature space using LDA as described earlier so that each pattern is represented by a vector with 199 elements. There are 200 clients, so from the identification viewpoint this presents a 200 class problem. A BCH equi-distance code containing 200 codewords (compound labels) 511 bits long is used. The Hamming distance between any pair of labels is 256 bits. The choice of code and advantages of equi-distance code are discussed in the aforementioned "Binary codes for multi-class decision combining" by T. Windeatt et al.

For the verification task, the level-zero classifier is a Multi-Layer Perceptron (MLP) with one hidden layer containing 199 input nodes, 35 hidden nodes and two output nodes. The Back-propagation algorithm with fixed learning rate, momentum and number of epochs is used for training. The dual output is mapped to a value between "0" and "1" to give an estimation of probability of super-class membership. For the identification task an MLP with three hidden nodes is used.

As already explained the outputs of the MLPs define an ECOC feature vector, and from equation (9), $d_i(\underline{y})$ for the claimed identity i is calculated by averaging over the respective class images. Both distance and similarity based rules for combining the outputs of the ECOC multiple classifiers have been investigated. Of the two decision functions, the distance based rule is the only one that depends on a parameter (i.e. the decision threshold) that has to be selected.

Distance Based Combination

Normally one would use the evaluation set data to compute the Receiver Operating Characteristics (ROC) curve which plots the relationship of false rejection (FR) rate and false acceptance (FA) rate as a function of threshold. A suitable threshold is then selected to achieve the required behaviour; for instance, one can specify the threshold that delivers equal false rejection and false acceptance rates. The threshold can be selected for each client separately, or globally by averaging the errors over all the clients.

A difficulty that can be encountered with the ECOC-based approach of this invention is that the FR and FA errors on the evaluation set are zero for a large range of thresholds because the level-zero classifier is "too powerful". In such circumstances, the ROC curve is not very useful in threshold setting. This problem can be overcome by the following procedure. Starting at t=0 the threshold is successively increased in fixed steps to find the point at which the total error (the sum of FR and FA errors) is minimum. If the total error is zero for several such increments the selected threshold would correspond to the point just before the total error starts to rise.

The results obtained with the above threshold selection procedure using the evaluation set data are given in Table 1 as a function of step size. Because different step sizes terminate the threshold selection procedure at different destinations from the imposters in the evaluation set the test set performance varies. Table 2 shows error rates obtained when seeds from both the evaluation (Ev) and test (Ts) sets are used to set the thresholds. Even though generalisation has improved, it is not clear from the evaluation set performance how to select the best step size.

| search step | FR(Ev) | FA(Ev) | FR(Ts) | FA(Ts) |
|---|---|---|---|---|
| .25 | 0 | 0 | 13.2500 | 0.1078 |
| .2 | 0 | 0 | 10.5000 | 0.1422 |
| .1 | 0 | 0 | 6.5000 | 0.2772 |
| .05 | 0 | 0 | 5.2500 | 0.4130 |
| .01 | 0 | 0 | 4.7500 | 0.6540 |
| .005 | 0 | 0 | 4.7500 | 0.7111 |
| .001 | 0 | 0 | 4.5000 | 0.7391 |

Table 1: Result of Verification when the Clients in the Evaluation Set Are Used as Seeds One possibility is to combine the results from all step sizes, and the final row of table 2 shows the result of such majority vote combination.

| search step | FR(Ev) | FA(Ev) | FR(Ts) | FA(Ts) |
|---|---|---|---|---|
| .2 | 0 | 0.065 | 6.75 | .1676 |
| .1 | 0 | 0 | 4.50 | .2174 |
| .05 | 0 | 0 | 3.25 | .3668 |
| .01 | 0 | 0 | 1.25 | .6495 |
| .005 | 0 | 0 | 1.25 | .7038 |
| .001 | 0 | 0 | 1.25 | .7482 |
| combining | 0 | 0 | 1.25 | .6603 |

Table 2: Result of Verification when the Clients in the Evaluation and Training Sets are Used as Seeds To demonstrate the effectiveness of ECOC the result of applying the exhaustive search method directly to the original 199 dimensional feature vectors is shown in Table 3. Comparing Tables 2 and 3, the benefits of mapping the input data onto the ECOC output vectors are clearly visible. Note also that in this case the evaluation set error rates are non zero, i.e. the population of clients and imposters are overlapping. In this particular case the ROC curve could have been computed but this was not pursued because it was clearly inferior to the ECOC based approach.

| search step | FR(Ev) | FA(Ev) | FR(Ts) | FA(Ts) |
|---|---|---|---|---|
| .25 | 1.67 | 0.89 | 16.75 | 1.105 |
| .2 | 0.83 | 1.07 | 15.25 | 1.144 |
| .01 | 0.167 | 0.33 | 8.0 | 1.180 |
| .005 | 0.167 | 0.31 | 8.0 | 1.239 |
| .001 | 0.167 | 0.2925 | 8.0 | 1.310 |

Table 3: Result of Verification in the Fisher Face Features Space

Kernel Combination

Although kernel combination method requires no thresholds, there are design parameters that can be varied to control the behaviour of the method. In particular, it is possible to choose different ways to represent impostors. Each of the 25 evaluation impostors has 4 sets of 2 images as already explained. Therefore, as an alternative to 25 centres averaged over 4 sets, we can choose 50 centres averaged over 2 sets or 100 centres averaged over 1 set. The error rates for 25, 50, 100 impostor centres, along with the results of combining by majority vote are shown in Table 4. In comparison with Table 2, there is a different trade-off between false acceptance and false rejection rates.

| impostor centres | FR(Ev) | FA(Ev) | FR(Ts) | FA(Ts) |
|---|---|---|---|---|
| 25 | 0 | 0 | 0.7500 | 0.8833 |
| 50 | 0 | 0 | 0.5000 | 0.8786 |
| 100 | 0 | 0 | 0.7500 | 1.2455 |
| combining | 0 | 0 | 0.7500 | 0.8596 |

Table 4: Result of Verification Using the Kernal Score with Different Numbers of Centres for the Impostors Comparison with Other Methods For comparison purposes, the results obtained using three other methods on the same data set and using the same evaluation protocol are given. Those methods use the same representation of image data in terms of 199 fisher face coefficients. They employ three different scores for decision making in this feature space. In particular, the Euclidean metric, $S_E$, Normalised correlation, $S_N$, and Gradient metric, $S_O$, as described in the afore-mentioned "On Matching Scores for lda-based face verification" by J. Kittler et al are used. The results are summarised in Table 5.

| | Evaluation set | | | Test set | | |
|---|---|---|---|---|---|---|
| Score | FR | FA | TE | FR | FA | TE |
| $S_E$ | 7.83 | 7.83 | 15.66 | 5.50 | 7.35 | 12.85 |
| $S_N$ | 2.50 | 2.50 | 5.00 | 2.25 | 2.56 | 4.81 |
| $S_O$ | 1.74 | 1.74 | 3.48 | 1.75 | 1.70 | 3.45 |

Table 5: Performance of the Three Baseline Matching Scores on Manually Registered Images The results show a number of interesting features. First of all, by comparing the Euclidean metric performance with the proposed distance $d_i(y)$ in Table 3 it would appear that the more robust metric used in $d_i(y)$ combined with the multiseed representation of clients may be more effective than the Euclidean distance based score. Most importantly, all the ECOC based results are decisively superior to the decision making in the original Fisher face space. Finally, the combination of ECOC multiple classifier outputs by means of the relative similarity score given by Equation 12 above appears to yield slightly better results than using the distance based score $d_i(y)$. The implication of this finding and of the work reported elsewhere is that the choice of decision (score) function plays an extremely important role in the design of verification systems and should receive more attention in the future.

In summary, the face verification and identification process and system of the described embodiment are based on an Error Correcting Output Coding (ECOC) classifier design approach. In a training phase the client set is repeatedly divided into two ECOC specified sub-sets (super-classes) to train a set of binary classifiers. The output of the classifiers defines the ECOC feature space, in which it is easier to separate transformed patterns representing clients and impostors. As a matching score in the ECOC feature space a novel distance-based measure and a novel kernel-based similarity measure have been developed. The distance-based score computes the average first order Minkowski distance between an input facial image and a class of training images which is found to be more effective than the Euclidean metric. The described process and system were shown to exhibit superior verification performance on the well known XM2VTS data set as compared with previously reported results. It will be appreciated from the foregoing that an input facial image purported to be that of a known individual (a client) can be authenticated or verified with reference to a class of different training images representing that individual (the above-described distance-based measure approach). Alternatively, the input facial image can be authenticated or verified with reference to other classes of training images representing different individuals (impostors) as well as the class of training image representing the client (the above described kernel-based similarity approach).

The input facial image may represent an individual whose identity is unknown. In this case, either the distance-based measure approach or the kernel-based similarity approach can be used to authenticate the input facial image (and so identify the individual) using any of the different classes of training images as the client class.

The invention claimed is:

1. A personal identity verification process for evaluating authenticity of an input facial image against a class of different training images representing the face of an individual, the process including
processing image data representing the input facial image to generate a first error correcting output code (ECOC) classifier output vector,
processing image data representing the different training images of the class to generate a set of second ECOC classifier output vectors,
comparing the first ECOC classifier output vector with the set of second ECOC classifier output vectors, wherein the comparing includes measuring a distance d(y) between the first ECOC classifier output vector and the set of second ECOC classifier output vectors using a first order Minkowski metric, the distance d(y) being given by the expression $$d(y) = \frac{1}{N}\sum_{l=1}^{N}\sum_{j=1}^{b}|y_j^l - y_j|,$$

where $y_j$ is the jth element of the first ECOC classifier output vector,
$y_j^l$ is the jth element of the lth member of the set of second ECOC classifier output vectors.
N is the number of members in the set, and
b is the number of classifiers, and
the input facial image is evaluated to be authentic if the distance d(y)≦t, where t is a predetermined threshold value, and
evaluating authenticity of the input facial image with respect to the class of training images in dependence on the comparing.

2. A personal identification verification process for evaluating authenticity of an input facial image against the class of different training images representing the face of an individual, the process including:
processing image data representing the input facial image to generate a first error correcting output code (ECOC) classifier output vector,
processing image data representing the different training images of the class to generate a set of second ECOC classifier output vectors, including processing image data representing a plurality of the classes of different training images to generate a respective set of second ECOC classifier output vectors for each class, each class of training images representing the face of a different individual,
comparing the first ECOC classifier output vector with the set of second ECOC classifier output vectors by measuring a distance between the first ECOC classifier output vector and each set of second ECOC classifier output vectors, and
evaluating authenticity of the input facial image with respect to the class of training images in dependence on the comparing by combining distances measured to evaluate authenticity of input facial image with respect to one of classes of training images. including combining distances measured as a combination that is a summation of exponential kernel functions, each kernel function having an exponent related to a different respective distance, wherein the combination is given by the expression:

$$k(y) = \sum_\alpha w_\alpha \exp-\left\{\frac{d_\alpha(y)}{\sigma^2}\right\}$$

where α is an index signifying class,
$d_\alpha(y)$ is the measured distance between the first ECOC classifier output vector and a respective set of second ECOC classifier output vectors and
$W_\alpha$ is a respective predetermined weighing function, and
the input facial image is evaluated to be authentic if k(y) ≦t', where t' is a predetermined threshold value.

3. The process as claimed in claim 1 wherein the threshold value t is so selected that FA+FR is substantially a minimum with respect to the threshold value t, where FA is false acceptance rate and FR is false rejection rate.

4. The process as claimed in claim 1 wherein processing image data includes projecting the image data into a lower dimensional space and generating the first and second (ECOC) classifier output vectors from the image data so projected.

5. A process as claimed in claim 4 wherein projecting the image data includes Linear Discriminant Analysis.

6. The process as claimed in claim 5 wherein projecting the image data includes Principal Component Analysis.

7. The process as claimed in claim 1 including:
processing image data representing a plurality of the classes of different training images to generate a respective set of second ECOC classifier output vectors for each class, each class of training images representing the face of a different individual,
comparing the first ECOC classifier output vector with different ones of the sets of second ECOC classifier output vectors, and
evaluating authenticity of the input facial image with respect to a respective class of training images in dependence on the comparing.

8. A personal identity verification system including:
means for storing image data representing an input facial image and at least one class of different training images, and
processing means for processing the stored image data according to the process of claim 1.

* * * * *